3,033,759
PROCESS FOR THE MANUFACTURE OF 11α-HYDROXY-6α-HALOGEN-PREGNENES

Albert Wettstein, Riehen, and Ernst Vischer, Basel, Switzerland, assignors to Ciba Pharmaceutical Products Inc., Summit, N.J.
No Drawing. Filed Feb. 9, 1960, Ser. No. 7,545
Claims priority, application Switzerland Feb. 12, 1959
1 Claim. (Cl. 195—51)

The object of the present invention is a high-yield process for the manufacture of $\Delta^4$-6α-fluoro- or -chloro-16-alkyl-11α:17α:21-trihydroxy-pregnene-3:20 - dione and $\Delta^{1:4}$-6α-fluoro- or -chloro-16-alkyl-11α:17α:21-trihydroxypregnadiene-3:20-diones and their functional derivatives by microbiological methods. These compounds are important intermediates for the manufacture of the corresponding $\Delta^4$ and $\Delta^{1:4}$-6α:9α-difluoro- or 6α:9α-dichloro-16-alkyl-11β:17α:21-trihydroxy - pregnadiene-3:20-diones respectively or of the corresponding 11-oxo-compounds which are distinguished by an antiinflammatory, glucocorticoid, thymolytic, catabolic, antiandrogenic and antioestrogenic activity.

It is known that $\Delta^4$- and $\Delta^{1:4}$-3-keto-steroids, e.g. $\Delta^{1:4}$-16α-methyl-17α:21-dihydroxy - pregnadiene - 3:20 - dione, can be hydroxylated microbiologically in 11-position. However, in the case of the 6-halogenated derivatives, the microbiological introduction of hydroxyl into the 11-position hitherto presented considerable difficulties.

It has now been found that enzymes of the fungus *Aspergillus ochraceus* oxidize $\Delta^{1:4}$-6α-fluoro- or -chloro-16-alkyl-, in particular $\Delta^{1:4}$-6α-fluoro- or -chloro-16α-methyl-17α:21-dihydroxy-pregnadiene-3:20-dione, and $\Delta^4$-6α-fluoro- or -chloro-16-alkyl-, in particular $\Delta^4$-6α-fluoro- or -chloro-16α-methyl-17α:21-dihydroxy - pregnene-3:20-dione to give the corresponding 11α-hydroxy compounds in almost quantitative yield.

The transformation of the above-mentioned starting materials by means of the said fungus, that is with the enzymes obtained therefrom, can be carried out by the working methods known per se for microbiological hydroxylation. The starting materials are generally incubated direct with cultures of the said strains growing under aerobic conditions. These cultures are advantageously moved, i.e. shaken or stirred, and contain assimilable carbon, in particular corn steep liquor or beer wort, and inorganic salts. Thus, natural, synthetic or semisynthetic nutrient solutions can be used. The method which is simplest from the practical point of view is described hereinafter, but it is not intended that the invention be limited by these details:

The organisms are cultivated in apparatus under conditions similar to those known in the manufacture of antibiotics as the so-called deep tank process. The temperature is preferably maintained at 24°–27° C. and under these conditions the cultures are fully developed after 1–2 days. The starting material is then added under sterile conditions in fine dispersion or solution, for example in methanol, ethanol, acetone, dioxane or propylene glycol, either in a single operation or in stages, and incubation is continued. Finally, the culture filtrate is separated from the mycelium, the mycelium is extracted if required, for example with methanol or acetone, and the concentrated extract is added to the culture filtrate. This is extracted with a suitable organic solvent, such as ethyl acetate, chloroform, ethylene chloride or methylene chloride, the extract is washed with dilute sodium hydrogen carbonate solution and with water and finally it is evaporated. The oxidation product can be isolated from the residue in one of the following ways: Either the residue is crystallized direct from a suitable solvent, such as, for instance, acetone-petroleum ether, methylene chloride-ether, aqueous methanol, etc., or it is subjected to one of the following preliminary treatments:

Distribution between petroleum ether and methanol-water (80:20), the products of the process being enriched in the methanol phase; treatment of a solution of the residue in a suitable solvent such as, for example, methanol, ethanol, acetone or the like with an absorption agent, such as active carbon or aluminum oxide. In this way, the 11α-hydroxy-derivatives are obtained in pure form.

The starting materials are new. They can be prepared for example in the following manner:

A $\Delta^{5:17(20)}$-3β:20-diacyloxy-16α-methyl-pregnadiene of the formula

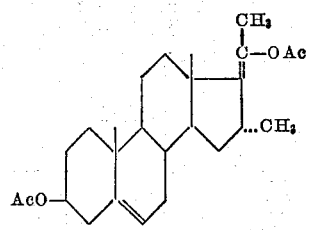

is oxidized with a peracid, if desired the isomeric mixture of 5:6, 17:20-dioxido-3β:20-diacyloxy-16α-methyl-pregnane obtained is treated with an oxygen-containing mineral acid, the secondary hydroxyl group in the resulting 5α:6β-dihydroxy compound is esterified with a sulfonic acid, treatment is then carried out with an alkaline agent, the resulting 5α:6α - oxido - 17α - hydroxy - 20 - ketone is treated with a hydrogen halide and then with bromine; the 21-bromide thus formed is treated with a salt of an aliphatic carboxylic acid of low molecular weight; in the resulting 3:17α-dihydroxy-21-acyloxy-5α:6α - oxido - 16α-methyl-pregnane, before or after oxidizing the 3-hydroxy to the keto group, the 5α:6α-oxido group is opened to form the 5α-hydroxy-6β-fluorohydrin or 5α-hydroxy-6β-chlorohydrin; the 5α-hydroxyl group is eliminated with formation of the 4:5-double bond; a 6β-halogeno compound is isomerized to a 6α-halogeno compound; and if desired, a double bond is introduced into the 1:2-position of the resulting $\Delta^4$-3:20-dioxo-17α-hydroxy-21-acyloxy-16α-methyl-6α-fluoro- or 16α-chloro-pregnene; and/or in a resulting compound the 21-acyloxy-group is hydrolized.

The invention is described in the following examples. The temperatures are given in degrees centigrade.

Example 1

4 liters of a nutrient solution containing the following additions to 1 liter of tap water: 10 grams of crude glucose, 10 grams of distillers solubles, 5 grams of sodium chloride, 1 gram of sodium nitrate and 10 grams of calcium carbonate, are prepared. The pH is adjusted to 7.5 and the solution is sterilized in a shaking vessel for 30 minutes at 1.1 atmospheres gauge pressure. After cooling, the nutrient solution is inoculated with a culture of *Aspergillus ochraceus* (Ciba 924), after which the vessel is shaken at a temperature of 25° C. After 2 days, a solution of 1 gram of $\Delta^4$-6α-fluoro-16α-methyl-17α:21-dihydroxy-pregnene-3:20-dione-21-acetate in 25 cc. of methanol is added to the well-developed culture under sterile conditions and shaking is continued for a further 48 hours at the same temperature. The mycelium is then separated, suspended for one hour in 800 cc. of warm acetone and once more filtered off. The acetone filtrate is thereupon strongly concentrated in vacuo and then combined with the culture filtrate. The combined filtrates are extracted three times with 0.8 liter of acetic ester in each case and the extracts are then washed with a 2% solution of sodium hydrogen carbonate and with water, dried over sodium sulfate, filtered and evaporated to dryness in vacuo at a temperature of 30°–35° C. 1.4 grams of an oily residue are obtained, the steroid constituent of which consists, according to evaluation by paper chromatography, almost exclusively of Δ⁴-6α-fluoro-16α-methyl-11α:17α:21-trihydroxy-pregnene-3:20-dione. This residue is dissolved in 80 cc. of methanol and 100 cc. of petroleum ether and 20 cc. of water are added to the solution and the mixture is shaken. The methanol phase is thereupon separated off, shaken up twice more with 35 cc. of petroleum ether in each case and after the petroleum ether phase has been separated off is evaporated at a temperature of 30°–35° in vacuo. 980 mg. of a partially crystalline residue are obtained. By recrystallization from an acetone-ether mixture Δ⁴-6α-fluoro-16α-methyl-11α:17α:21-trihydroxy-pregnene-3:20-dione is obtained in pure form.

In similar manner there is obtained from Δ¹,⁴-6α-fluoro-16α-methyl-17α:21 - dihydroxy-pregnadiene - 3:20-dione-21-acetate, by crystallization of the crude oxidation product obtained from an acetone-ether mixture, Δ¹,⁴-6α-fluoro-16α-methyl-11α:17α:21 - trihydroxy - pregnadiene-3:20-dione in colorless crystals.

Example 2

A 4-liter culture of *Aspergillus ochraceus* (Ciba 924) is prepared as described in Example 1 and a solution of 1 gram of Δ⁴-6α-fluoro-16α-methyl-17α:21-dihydroxy-pregnene-3:20-dione in 25 cc. of methanol is added thereto under sterile conditions. After incubation and working up as indicated in Example 1, homogeneous Δ⁴-6α-fluoro - 16α - methyl - 11α:17α:21 - trihydroxy - pregnene-3:20-dione is obtained.

Example 3

If a nutrient solution containing 2.6 grams of ammonium tartrate, 2.6 grams of tartaric acid, 0.4 gram of potassium carbonate, 0.4 gram of ammonium phosphate, 0.27 gram of magnesium carbonate, 0.17 gram of ammonium sulfate and 50 grams of crude glucose to 1 liter of tap water is employed, excellent transformation of Δ⁴-6α-fluoro - 16α-methyl - 17α:21 - dihydroxy-pregnene-3:20-dione and of the corresponding 21-acetate into Δ⁴-6α-fluoro - 16α - methyl - 11α:17α:21 - trihydroxy - pregnene-3:20-dione is obtained when the remainder of the procedure detailed in Example 1 is followed.

What is claimed is:

Process for the manufacture of oxygenated steroids by microbiological 11-hydroxylation, wherein a compound selected from the group consisting of Δ⁴-6α-fluoro-16α-alkyl - 17α:21 - dihydroxy - pregnene - 3:20-diones, Δ⁴-6α-chloro-16α-alkyl-17α:21-dihydroxy-3:20-diones, their 1-dehydro-derivatives and 21-esters is treated with an enzyme of the fungus *Aspergillus ochraceus*.

References Cited in the file of this patent
UNITED STATES PATENTS

| | | |
|---|---|---|
| 2,649,402 | Murray et al. | Aug. 18, 1953 |
| 2,802,775 | Dulaney et al. | Aug. 13, 1957 |
| 2,905,593 | Dulaney et al. | Sept. 22, 1959 |